(12) United States Patent
Lich et al.

(10) Patent No.: US 9,221,466 B2
(45) Date of Patent: Dec. 29, 2015

(54) METHOD FOR AUTOMATICALLY CORRECTING A STATE VARIABLE OF A VEHICLE

(75) Inventors: Thomas Lich, Schwaikheim (DE); Stephan Stabrey, Stuttgart (DE); Andreas Georgi, Schwieberdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1364 days.

(21) Appl. No.: 12/665,897

(22) PCT Filed: Jun. 5, 2008

(86) PCT No.: PCT/EP2008/056958
§ 371 (c)(1),
(2), (4) Date: Jun. 9, 2010

(87) PCT Pub. No.: WO2009/000619
PCT Pub. Date: Dec. 31, 2008

(65) Prior Publication Data
US 2010/0256869 A1 Oct. 7, 2010

(30) Foreign Application Priority Data
Jun. 28, 2007 (DE) .......................... 10 2007 029 909

(51) Int. Cl.
| *A01B 69/00* | (2006.01) |
| *B60W 40/10* | (2012.01) |
| *B60W 10/184* | (2012.01) |
| *B60W 30/12* | (2006.01) |
| *B60W 10/20* | (2006.01) |
| *B60W 30/09* | (2012.01) |
| *B60W 40/02* | (2006.01) |

(52) U.S. Cl.
CPC .............. *B60W 40/10* (2013.01); *B60W 10/184* (2013.01); *B60W 30/12* (2013.01); *B60W 10/20* (2013.01); *B60W 30/09* (2013.01); *B60W 40/02* (2013.01); *B60W 2510/20* (2013.01); *B60W 2510/202* (2013.01); *B60W 2520/14* (2013.01); *B60W 2710/20* (2013.01); *B60W 2720/403* (2013.01)

(58) Field of Classification Search
USPC ........................................................ 701/41
See application file for complete search history.

(56) References Cited

U.S. PATENT DOCUMENTS

| 6,009,377 A | * | 12/1999 | Hiwatashi ...................... 701/301 |
| 6,155,377 A | * | 12/2000 | Tokunaga et al. ............. 180/446 |
| 6,763,908 B2 | * | 7/2004 | Ogawa et al. ................. 180/446 |
| 2002/0095246 A1 | * | 7/2002 | Kawazoe ........................... 701/1 |
| 2004/0016594 A1 | * | 1/2004 | Yasui et al. .................... 180/446 |
| 2005/0236210 A1 | * | 10/2005 | Kawazoe et al. ............. 180/272 |
| 2006/0058935 A1 | * | 3/2006 | Ghoneim et al. ............... 701/41 |
| 2007/0182138 A1 | * | 8/2007 | Lich et al. ..................... 280/735 |
| 2008/0091318 A1 | * | 4/2008 | Deng et al. ...................... 701/41 |

FOREIGN PATENT DOCUMENTS

| DE | 195 06 364 | 8/1995 |
| DE | 197 52 175 | 5/1998 |

(Continued)

*Primary Examiner* — Michael D Lang
(74) *Attorney, Agent, or Firm* — Kenyon & Kenyon LLP

(57) ABSTRACT

In a method for automatically correcting a state variable of a vehicle, in the event of the vehicle having departed from the predefined lane a vehicle control system is re-parameterized in such a way that an intervention predefined by the driver is converted in a reduced manner into a change in a vehicle state variable.

37 Claims, 1 Drawing Sheet

(56) References Cited

FOREIGN PATENT DOCUMENTS

| | | |
|---|---|---|
| DE | 10 2005 003 177 | 7/2006 |
| EP | 0 853 031 | 7/1998 |
| EP | 1 544 070 | 6/2005 |
| JP | 09 142327 | 6/1997 |
| JP | 10-194151 | 7/1998 |

* cited by examiner

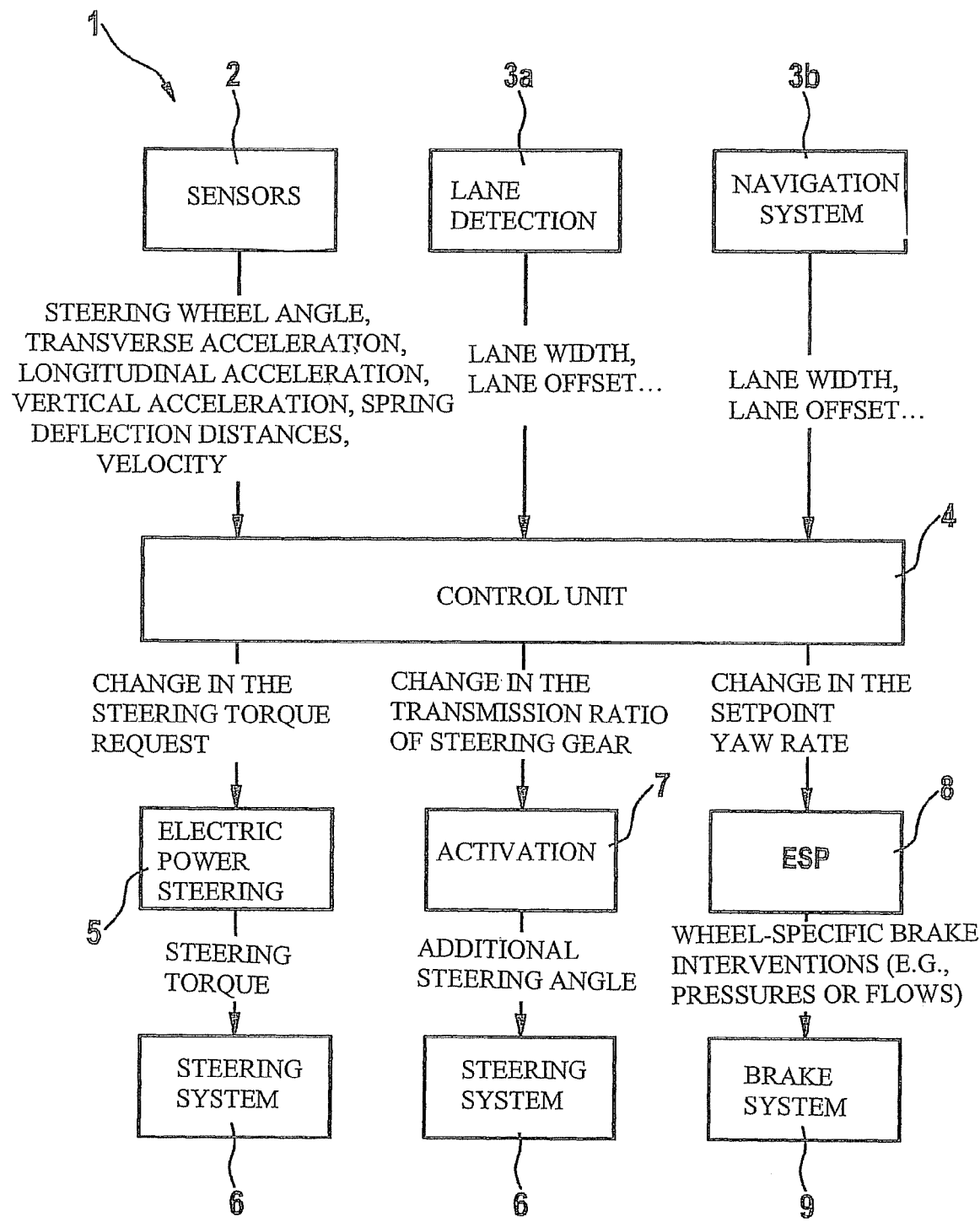

METHOD FOR AUTOMATICALLY CORRECTING A STATE VARIABLE OF A VEHICLE

FIELD OF THE INVENTION

The present invention relates to a method for automatically correcting a state variable of a vehicle when leaving a predefined lane.

BACKGROUND INFORMATION

For preventing vehicle accidents in the event that the correct lane is going to be departed, DE 10 2005 003 177 A1 discusses a method/system to generate a counter-steering torque in the vehicle's steering system which counteracts the steering angle imposed by the driver. Such lane keeping systems (lane keeping assist) are aimed at keeping the vehicle in the predefined lane or returning it into the lane for preventing accidents. A precondition for this is a complex sensor system which permanently monitors the instantaneous vehicle position with regard to the lane and, in the event of an inadmissible departure from the setpoint trajectory, generates an appropriate counter-steering torque.

According to a vehicle steering system from DE 195 06 364 C2, the instantaneous vehicle position is determined with the aid of a navigation device, and the driving speed is corrected by automatic braking, and the vehicle position is corrected by automatic setting of the steering torque or the steering angle, so that the vehicle is able to drive safely through a curve.

Such lane keeping systems are characterized by an additional, driver-independent intervention in the vehicle state in order to keep it in the lane contrary to the driver input. However, it must be taken into account that in certain driving situations a lane departure may be intentional, e.g., to avoid an obstacle in the lane. Furthermore, quickly and reliably operating vehicle and surroundings sensor systems must be provided for safe functioning of the lane keeping system which involves considerable technical and financial expenditures.

SUMMARY OF THE INVENTION

The exemplary embodiments and/or exemplary methods of the present invention are based on the object of increasing the driving safety in potential danger situations using simple measures. In particular, it should be prevented that startle reflexes by the driver result in increased endangerment.

This object may be achieved according to the exemplary embodiments and/or exemplary methods of the present invention by the features described herein. Also described herein are advantageous refinements.

In the method according to the present invention for automatically correcting a state variable of a vehicle, e.g., a state variable determining the longitudinal and/or transverse dynamics, it is initially established whether the vehicle has departed from the predefined lane; if this is the case, i.e., the vehicle is no longer in the lane at least with one wheel, a vehicle control system in the vehicle is re-parameterized in such a way that an intervention in the vehicle predefined by the driver is converted, in a reduced manner, compared to the normal situation, into a change in a vehicle state variable.

This approach combines several advantages. On the one hand, the driving safety is considerably increased since startle reflexes by the driver, which are normally associated with excessive operation of a control element, e.g., the steering wheel, by the driver, may be attenuated by suitable interventions by active systems to the extent that the vehicle's response to the input of the driver does not result or only in a reduced way results in further endangerment. The inputs of the driver are thus continued to be carried out, but only in a reduced manner compared to normal driving situations. Therefore, a too intensive intervention by the driver will not result in a correspondingly strong and dangerous vehicle response; in fact, the vehicle will respond less strongly to the driver's intervention.

A further advantage of the method according to the present invention is the relatively simple technical implementability which basically does not require additional technical equipment beyond the equipment which is on board the vehicle anyway. It is thus possible in particular, in the event of lane departure, to re-parameterize existing vehicle control systems solely on the software level without having to provide an additional sensor system or an additional actuator system.

Re-parameterization is carried out as soon as it is detected that the vehicle has departed from the lane. For detecting the lane departure, the on-board sensor system, possibly including a surroundings sensor, is used, e.g., a navigation system (position finding system including a digital map) or other lane detection systems, in particular on a visual basis (video-based lane detection) or on radar, lidar, or an ultrasound basis. Analyzing accelerations or spring deflection distances registered in the vehicle may be considered as another possibility of detecting a lane departure, which has the advantage that this may be carried out using a relatively simple sensor system which in part is present anyway. In this case, there is a high degree of probability of a lane departure once the acceleration variables or spring deflection distances are outside admissible limiting values. As the case may be, a combination of the signals of different sensors is also possible in order to be able to infer a lane departure with sufficient certainty.

Further advantages of the method according to the present invention are to be seen in the fact that the driver basically maintains the decision sovereignty over the vehicle movement since in principle the interventions by the driver are implemented. The vehicle response thus does not result in an additional irritation which may otherwise be created in vehicle systems in which a driver-independent intervention is carried out which possibly differs totally from the original driver input. Additional panic or startle reflexes by the driver are thus prevented or at least attenuated.

According to a preferred embodiment, it is provided that as a response to a driver input vehicle state variables are manipulated on the position, velocity, and/or acceleration levels. As the case may be, the process intervention takes place exclusively on one or more of these level(s), so that ultimately the vehicle position is changed according to the driver input. However, it may also be advantageous to manipulate other state or influence variables in the vehicle, e.g., by predefining a counter-steering torque which counteracts a panic steering action by the driver.

According to another advantageous embodiment, steering interventions by the driver are converted in a reduced manner into a corresponding wheel steering angle. This takes place advantageously in steering systems which are equipped with active steering and, in particular, have an overriding gear system in which an additional steering angle may override a steering angle input by the driver. Such active steering systems, also known as AFS (active front steering) or EAS (electronic active steering), allow a change in the transmission ratio of the steering gear by active intervention which is used for the purposes of the method according to the present invention in such a way that after the lane departure a more indirect steering transmission ratio is set so that a steering angle input by the driver results in a smaller change in the wheel steering angle.

In addition to the variable steering gear transmission ratio, an additional steering function called "derivative action" may be implemented in known active steering systems. This function sets an additional steering angle as a function of the gradient of the steering angle input by the driver. In normal driving operation, this results in a more agile performance since the vehicle responds faster to quick steering angle changes due to the set additional steering angle. However, in order to avoid an increase in the overreaction in the event of a startle reflex by the driver, the steering function "derivative action" is deactivated for reducing the detrimental effects of a startle reflex in the event of a lane departure.

In a further manipulation option, the driver intervention in an electronic stability program ESP may result in a reduced vehicle state variable, in particular by changing the setpoint value computation, e.g., by adjusting the setpoint yaw rate. In normal situations, the electronic stability program would support a panicky turn of the steering wheel by the driver using appropriate interventions in the vehicle. However, in the system according to the present invention, by adjusting the setpoint value computation the interventions are carried out in such a way that, by preferably retaining the vehicle stability, the vehicle follows the driver's steering input in a reduced way.

According to a further advantageous embodiment, the gradient of a vehicle state variable and/or a surroundings variable and/or driver operating variable is/are used directly before the lane departure for computing the reduction in the vehicle state variable. In particular, the course of the lane directly before the lane departure may be considered, e.g., for using the curve's curvature before the lane departure for determining the setpoint yaw rate. If a sensor system for directly ascertaining the curve's curvature is not available, the curve's curvature may also be inferred from the steering angle prevailing before the lane departure for ascertaining a setpoint yaw rate. In addition, the course of the lane may be considered as the trigger criterion for starting the method according to the present invention, in particular as a plausibility criterion that the vehicle has actually departed from the lane.

A combination of interventions in different vehicle control systems is basically possible, i.e., an intervention in the ESP as well as in an active steering system, for example.

The vehicle state variable to be manipulated may be reduced to a fraction of the initial value, the fraction being either predefined or once ascertained from further vehicle state variables or operating variables or continuously updated.

For starting the method according to the present invention, additional triggering conditions may be formulated. For example, the intervention in one of the vehicle control systems is only carried out when a startle or panic driver reflex is actually detected which may be detected, for example, by comparing the gradient of a driver input with an assigned threshold value. For this purpose, the gradient of the steering angle input may be checked for exceeding a threshold value since the change in the steering angle position by the driver having a correspondingly high rate of change suggests a startle reflex; in this case, the method according to the present invention is started. Additionally to or instead of the gradient of the steering angle input, the yaw rate change in the vehicle or the speed of brake pedal operation may be examined.

The entire method is appropriately executed in a controller or control unit which is present in the vehicle and communicates with the various vehicle control systems.

Further advantages and appropriate embodiments arise from the further description herein, the description of the drawing, which shows a block diagram of a system, to be implemented in a vehicle for automatically correcting a state variable of a vehicle during departure from a predefined lane.

BRIEF DESCRIPTION OF THE DRAWING

The FIGURE shows a block diagram of a system, to be implemented in a vehicle for automatically correcting a state variable of a vehicle during departure from a predefined lane.

DETAILED DESCRIPTION

System 1 illustrated in the FIGURE includes various components which may be present in a vehicle and are required for automatically correcting a vehicle state variable. Via a vehicle sensor system 2, which includes at least one sensor, but conveniently multiple similar or different sensors, miscellaneous vehicle state variables may be ascertained, among others the steering wheel angle, which is input by the driver, the transverse acceleration, the longitudinal acceleration, the vertical acceleration, the spring deflection distances in the suspension damping system, as well as the vehicle velocity. Moreover, a surroundings sensor system 3a, 3b is provided using which the vehicle surroundings may be detected, in particular the lane and the instantaneous position of the vehicle with respect to the lane. For this purpose, the lane width and the instantaneous lane offset of the vehicle are ascertained. As a surroundings sensor system, a lane detection system, e.g., a video sensor, is provided in 3a and a navigation system in 3b.

The sensor signals ascertained in sensor systems 2, 3a, and 3b are supplied to a controller or control unit 4 in which the signals are analyzed and control or actuating signals are generated which are conveyed to the actuator system in the vehicle. If the analysis in controller or control unit 4 shows that the triggering conditions for the start of the method according to the present invention are present, at least one vehicle control system is re-parameterized. For establishing a triggering condition, it is checked, on the one hand, whether the vehicle has departed from the lane and, on the other hand, whether a startle reflex by the driver exists. These triggering conditions are checked using the supplied input signals of vehicle and surroundings sensor systems 2, 3a, and 3b.

If all triggering conditions are met, a corresponding re-parameterization is carried out in controller or control unit 4 and actuating signals are generated which are supplied to steering system 6 and/or brake system 9. An electric power steering system 5, via which the steering torque is affected, and an active steering system 7 for generating a superimposable additional steering angle are assigned to steering system 6 in the vehicle. If the analysis in controller or control unit 4 shows that the driver has set a steering angle, then the steering gear transmission is changed for which active steering system 7 in particular is manipulated in favor of a more indirect transmission ratio of the steering gear, thereby converting the driver's steering angle input only in a reduced manner—compared with a normal situation—into a corresponding wheel steering angle. In addition, the steering torque may be manipulated via electric power steering system 5, in particular a steering torque, counteracting the driver steering angle input, may be generated.

Additionally or alternatively to affecting the steering system, the electronic stability program (ESP) is also re-parameterized according to block 8. For this purpose, the setpoint yaw rate is modified in the controller or control unit, whereupon modified actuating signals, compared to normal situations, are generated in ESP system 8 which are to be supplied to various vehicle units, among other things to brake system 9 but also, if needed, to the engine controller and the steering system.

The invention claimed is:

1. A method for automatically correcting a state variable of a vehicle in the event of a departure from a predefined lane, the method comprising:
    re-parameterizing, in the event that the vehicle has departed from the predefined lane, a vehicle control system in the vehicle so that an intervention input by a driver is converted in a reduced manner into a change in a vehicle state variable.

2. The method of claim 1, wherein vehicle state variables of the vehicle are manipulated for at least one of a position, a velocity, and an acceleration level.

3. The method of claim 1, wherein a steering intervention by the driver is converted in a reduced manner into a wheel steering angle.

4. The method of claim 1, wherein a driver intervention in a superimposed steering gear results in a change in the steering transmission ratio.

5. The method of claim 1, wherein the driver intervention in an electronic stability program (ESP) results in a reduced vehicle state variable.

6. The method of claim 5, wherein the setpoint yaw rate is adjusted.

7. The method of claim 1, wherein a curve of a vehicle state variable or a surroundings variable directly before lane departure is used as the measure for reducing the vehicle state variable.

8. The method of claim 7, wherein the course of the lane is taken into account, in particular by being measured, directly before lane departure, via video.

9. The method of claim 1, wherein the vehicle state variable to be manipulated is reduced to a predefined fraction or to a fraction to be ascertained.

10. The method of claim 1, wherein the lane departure is detected based on the accelerations acting on the vehicle.

11. The method of claim 1, wherein the lane departure is detected based on the spring deflection distances of the wheels of the vehicle.

12. The method of claim 1, wherein the gradient of the driver response is compared to a threshold value as the triggering condition for the manipulation of the vehicle state variable.

13. The method of claim 12, wherein the gradient of the steering angle input is examined for exceeding an assigned threshold value.

14. The method of claim 12, wherein the yaw rate change is examined for exceeding an assigned threshold value.

15. The method of claim 1, wherein vehicle state variables of the vehicle are manipulated for at least one of a position, a velocity, and an acceleration level, and wherein a steering intervention by the driver is converted in a reduced manner into a wheel steering angle.

16. The method of claim 15, wherein a driver intervention in a superimposed steering gear results in a change in the steering transmission ratio.

17. The method of claim 15, wherein the driver intervention in an electronic stability program (ESP) results in a reduced vehicle state variable, and wherein the setpoint yaw rate is adjusted.

18. The method of claim 15, wherein a curve of a vehicle state variable or a surroundings variable directly before lane departure is used as the measure for reducing the vehicle state variable, and wherein the course of the lane is taken into account, in particular by being measured, directly before lane departure, via video.

19. The method of claim 15, wherein the vehicle state variable to be manipulated is reduced to a predefined fraction or to a fraction to be ascertained, and wherein the lane departure is detected based on the accelerations acting on the vehicle.

20. The method of claim 15, wherein the vehicle state variable to be manipulated is reduced to a predefined fraction or to a fraction to be ascertained, and wherein the lane departure is detected based on the spring deflection distances of the wheels of the vehicle.

21. The method of claim 15, wherein the vehicle state variable to be manipulated is reduced to a predefined fraction or to a fraction to be ascertained, and wherein the gradient of the driver response is compared to a threshold value as the triggering condition for the manipulation of the vehicle state variable.

22. The method of claim 21, wherein the gradient of the steering angle input is examined for exceeding an assigned threshold value.

23. The method of claim 21, wherein the yaw rate change is examined for exceeding an assigned threshold value.

24. A control unit for automatically correcting a state variable of a vehicle in the event of a departure from a predefined lane, comprising:
    a re-parameterizing arrangement for re-parameterizing, in the event that the vehicle has departed from the predefined lane, a vehicle control system in the vehicle so that an intervention input by a driver is converted in a reduced manner into a change in a vehicle state variable.

25. The control unit of claim 24, wherein vehicle state variables of the vehicle are manipulated for at least one of a position, a velocity, and an acceleration level.

26. The control unit of claim 24, wherein a steering intervention by the driver is converted in a reduced manner into a wheel steering angle.

27. The control unit of claim 24, wherein a driver intervention in a superimposed steering gear results in a change in the steering transmission ratio.

28. The control unit of claim 24, wherein the driver intervention in an electronic stability program (ESP) results in a reduced vehicle state variable.

29. The control unit of claim 28, wherein the setpoint yaw rate is adjusted.

30. The control unit of claim 24, wherein a curve of a vehicle state variable or a surroundings variable directly before lane departure is used as the measure for reducing the vehicle state variable.

31. The control unit of claim 30, wherein the course of the lane is taken into account, in particular by being measured, directly before lane departure, via video.

32. The control unit of claim 24, wherein the vehicle state variable to be manipulated is reduced to a predefined fraction or to a fraction to be ascertained.

33. The control unit of claim 24, wherein the lane departure is detected based on the accelerations acting on the vehicle.

34. The control unit of claim 24, wherein the lane departure is detected based on the spring deflection distances of the wheels of the vehicle.

35. The control unit of claim 24, wherein the gradient of the driver response is compared to a threshold value as the triggering condition for the manipulation of the vehicle state variable.

36. The control unit of claim 35, wherein the gradient of the steering angle input is examined for exceeding an assigned threshold value.

37. The control unit of claim 35, wherein the yaw rate change is examined for exceeding an assigned threshold value.

* * * * *